US008575801B2

(12) United States Patent
Plaideau

(10) Patent No.: US 8,575,801 B2
(45) Date of Patent: Nov. 5, 2013

(54) STARTER WITH ARMATURE SHAFT BEARING BETWEEN ARMATURE AND SPEED REDUCER

(75) Inventor: Stéphane Plaideau, Rochetoirin (FR)

(73) Assignee: Valeo Equipements Electriques Moteur, Creteil (FR)

( * ) Notice: Subject to any disclaimer, the term of this patent is extended or adjusted under 35 U.S.C. 154(b) by 211 days.

(21) Appl. No.: 13/056,060

(22) PCT Filed: Jul. 9, 2009

(86) PCT No.: PCT/FR2009/051359
§ 371 (c)(1),
(2), (4) Date: Apr. 14, 2011

(87) PCT Pub. No.: WO2010/018332
PCT Pub. Date: Feb. 18, 2010

(65) Prior Publication Data

US 2011/0181139 A1 Jul. 28, 2011

(30) Foreign Application Priority Data

Aug. 12, 2008 (FR) ...................................... 08 55525

(51) Int. Cl.

| | |
|---|---|
| ***H02K 7/06*** | (2006.01) |
| ***H02K 7/00*** | (2006.01) |
| ***F02N 15/00*** | (2006.01) |
| ***F02N 15/02*** | (2006.01) |
| ***F02F 1/42*** | (2006.01) |

(52) U.S. Cl.
USPC ................ 310/83; 310/75 R; 74/7 A; 74/7 E; 123/185.14

(58) Field of Classification Search
USPC ........... 310/83, 71, 75 R, 80, 84; 74/7 A, 7 E; 123/185.13; 248/582
See application file for complete search history.

(56) References Cited

U.S. PATENT DOCUMENTS

| | | | | |
|---|---|---|---|---|
| 4,573,364 | A * | 3/1986 | Givan | 74/7 E |
| 5,167,162 | A * | 12/1992 | Nagashima et al. | 74/7 A |
| 2007/0215089 | A1 * | 9/2007 | Grand et al. | 123/179.25 |

FOREIGN PATENT DOCUMENTS

| | | |
|---|---|---|
| EP | 1 406 008 | 4/2004 |
| FR | 2 614 363 | 10/1988 |
| FR | 2925619 A1 * | 6/2009 |
| GB | 2 113 319 | 8/1983 |

OTHER PUBLICATIONS

Machine Translation FR2925619 (2009).*

* cited by examiner

*Primary Examiner* — Tran Nguyen
*Assistant Examiner* — Jose Gonzalez Quinones
(74) *Attorney, Agent, or Firm* — Berenato & White, LLC

(57) ABSTRACT

The invention describes a starter wherein the second front bearing is inserted axially between the armature windings and the speed reducer. This configuration helps solve the problem that the operating forces of known starter armature shafts are too great for the armature shaft guide ring to withstand long term intensive stresses. The structure includes a supporting section of the armature shaft received in the front bearing, the supporting section being of an outside diameter greater than or equal to the other sections of the armature shaft; the front bearing forms a sealed baffle between the armature windings and the planetary gear speed reducer; the electric motor is housed in a cylindrical frame, coaxial with the armature shaft, the front bearing being centered directly with respect to the frame by radial support against the internal cylindrical face of the front peripheral edge of the frame.

14 Claims, 3 Drawing Sheets

STARTER WITH ARMATURE SHAFT BEARING BETWEEN ARMATURE AND SPEED REDUCER

FIELD OF THE INVENTION

The invention relates to a motor vehicle starter.

The invention relates more particularly to a motor vehicle starter comprising:

- an electric motor comprising a rear armature shaft which carries armature windings and which is rotationally guided by a first rear bearing and by a second front bearing;
- a coaxial front output shaft which carries a starter drive assembly and which is rotationally driven by the armature shaft;
- an epicyclic gear train speed reducer which is inserted axially between the rear armature shaft and the front output shaft for the coupling thereof.

BACKGROUND OF THE INVENTION

Internal combustion engined motor vehicles are conventionally fitted with a starter comprising a drive gear which engages with a ring gear of the engine, for rotationally driving the engine when it is being started.

A starter is generally designed to be used just once for each journey by the vehicle, at the time of starting of the engine.

However, more and more vehicles are fitted with so-called heat engine stop and restart systems, hereinafter designated “heat engine stop-restart system”, otherwise known by the name “stop and start”.

By means of these systems, it is possible to stop the heat engine during the vehicle stoppage phases and to restart it on the occurrence of a stimulus such as the driver’s first request or another criterion intended to make fuel savings.

Therefore, in the course of one single journey, the engine is likely to be stopped several times, at each red traffic light or in traffic jams, for example. The starter of a vehicle fitted with a stop-restart system is thus likely to be stressed much more than a starter of a conventional vehicle.

Because of this intensive use, certain parts of the starter are likely to be worn prematurely, thus shortening the starter’s life. This is particularly the case with one of the bearings of the starter’s armature shaft.

The starter is in fact fitted with an electric motor comprising an armature carried by an armature shaft. An output shaft, coaxial with the armature shaft, is rotationally driven by the latter via an epicyclic gear train speed reducer.

In a known way, an intermediate axial section of the armature shaft carries a planetary gear of the epicyclic gear train speed reducer which transmits rotary movement from the armature shaft to the output shaft. The epicyclic gear train speed reducer comprises an assembly of planetary gears which are carried by the output shaft.

An axial bore is formed in a rear axial end of the speed reducer output shaft. It opens on to the rear radial face of the rear free end of the output shaft and is blind at its other front end.

By means of this configuration, the front free end section of the motor armature shaft can be guided rotationally in the speed reducer output shaft axial bore with the insertion of a plain guide ring or a needle roller guide ring.

However, the armature shaft guiding front end section is of a smaller diameter than the other sections of the armature shaft, particularly to make possible the fitting of elements such as the planetary gear on to the armature shaft but also because the diameter of the bore in the output shaft is limited by the dimensions of the output shaft. The front end guiding section is of a diameter of 10 mm for example.

SUMMARY OF THE INVENTION

The weight and the moment of inertia of the armature shaft are too great with respect to the diameter of the armature shaft guiding section for the guide ring to be able to withstand intensive stresses for a life of the order of ten years.

To solve this problem in particular, the invention proposes a starter of the type described above, characterised in that the second front bearing is inserted axially between the armature windings and the speed reducer.

According to other features of the invention:

- a supporting section of the armature shaft is received in the front bearing, the supporting section being of an outside diameter greater than or equal to the other sections of the armature shaft;
- the armature shaft comprises a shouldering face which is intended to come into abutment axially forwards against the second front bearing to limit the displacement of the armature shaft axially forwards;
- the shouldering face is carried by a collar which runs radially outwards from the armature shaft;
- the front bearing forms a sealed baffle between the armature windings and the speed reducer;
- the speed reducer comprises planetary gears which are carried by the output shaft and which are fitted rotationally between two front and rear radial flanges, the flanges being kept apart axially by at least one spacer in order to prevent the nipping of the planetary gears when the rear flange is supported axially against the bearing;
- the spacer is formed by a rotary shaft of a planetary gear;
- the electric motor is housed in a cylindrical frame, coaxial with the armature shaft, the front bearing being centred directly with respect to the frame by radial support against the internal cylindrical face of the front peripheral edge of the frame;
- the starter comprises a front case to which are fastened the electric motor and a contactor which is intended for controlling the axial sliding of the starter drive assembly, the front bearing being inserted axially between the case and the frame;
- the front bearing comprises means of angular indexing of the frame with respect to the case;
- the front bearing is angularly indexed with respect to the case by means of at least one recess which is carried by either the front bearing or by the case and which is intended for receiving a lug carried by the other element;
- the starter comprises an inductor which is formed by a plurality of magnetised bars of axial orientation which are arranged evenly around the armature windings, the front bearing comprising notches, each of which is intended for receiving the front end of a magnetised bar for angularly indexing the front bearing with respect to the frame. However, in accordance with other embodiments of the invention, the inductor can be of any type whatsoever, with a plurality of magnets and/or coils which can be arranged in various different ways.
- the magnetised bars are separated circumferentially by axial spacers, the axial sliding forwards of the spacers being limited by a rear end radial face of the front bearing. Moreover, it is also possible to limit the axial sliding forwards of certain parts of the inductor, the magnets and shunts for example.

Other features and benefits will appear with the reading of the detailed description which will follow, for the understanding of which reference will be made to the attached drawings, among which:

DETAILED DESCRIPTION

In the further description, an axial orientation directed from rear to front and indicated by the arrow "A" in the illustrations will be adopted on a non-limiting basis.

In the further description, elements having similar, analogous or identical functions will be indicated by one single reference number.

Figure 1:
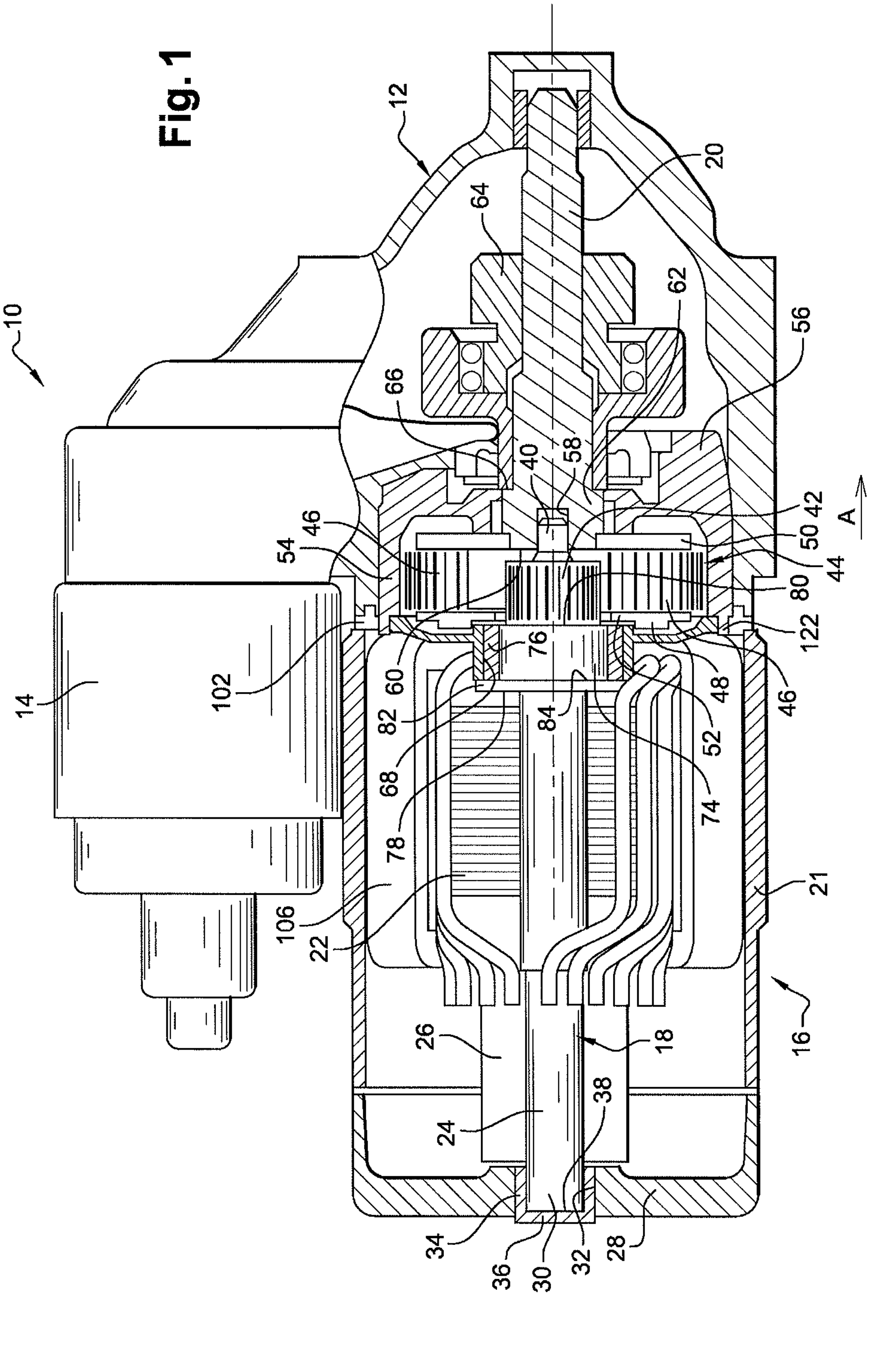
FIG. 1 shows a starter according to the invention, illustrated in partial axial section.

FIG. 1 shows a motor vehicle starter 10 which comprises a front case 12, to which a contactor 14 and an electric motor 16 are fastened.

The electric motor 16 rotationally drives a rear armature shaft 18 which itself rotationally drives a front output shaft 20. The front output shaft 20 is coaxial with the armature shaft 18 of the electric motor 16.

The electric motor 16 is housed in a substantially cylindrical tubular frame 21 of circular section which is coaxial with the armature shaft 18 and which is rigidly fastened to the case 12.

The motor 16 is a DC series electric motor with inductors 106. Its purpose is to convert the electrical energy which is supplied to it to mechanical energy to turn the armature shaft 18.

The electric motor 16 comprises the armature shaft 18, an intermediate section of which carries the armature windings 22 of the motor 16 and a rear axial section 24 of which carries an annular track commutator 26.

A closing rear cap 28 is fastened axially to the rear end circular edge of the frame 21.

A rear free end 30 of the armature shaft 18 is rotationally guided in a first rear bearing 32 formed by a housing in the closing cap 28. This rear housing 32 is secured to the closing cap 28.

A guide bush 34, such as a drawn cup needle roller bearing or a slip ring, is fitted to the inside diameter of the rear housing 32. By means of this fitting, the friction of the rear free end section 30 of the armature shaft 18 in the rear housing 32 can be minimised.

An axial stop means (not shown), such as a washer, is inserted between the rear end radial face 36 of the armature shaft 18 and the base 38 of the housing 32 in the closing cap 28.

The front part of the armature shaft 18 is stepped. A front free end section 40 is defined towards the rear by a planetary gear 42 of an epicyclic gear train speed reducer 44 which transmits the rotary movement of the armature shaft 18 to the output shaft 20.

The epicyclic gear train speed reducer 44 is inserted axially between the rear armature shaft 18 and the front output shaft 20.

The reducer 44 comprises an assembly of planetary gears 46, numbering three here, the rotary shafts 48 of which are carried by a first front flange 50 of radial orientation which is secured in translational movement and rotationally to the reducer output shaft 20 and which is fastened to the latter, by crimpage for example. The planetary gears 46 are thus carried by the output shaft 20, which forms a planetary gear holder.

The planetary gears 46 are axially immobilised with respect to translational movement by a second rear flange 52, force fitted to the shafts 48 of the planetary gears 46.

Thus, the planetary gears 46 are fitted so as to rotate between the front radial flange 50 and rear radial flange 52.

According to a variant (not shown) of the invention, the holding with respect to translational movement of the planetary gears 46 is effected by planetary gear shafts 48 screwed into the front flange 50 and each comprising a head.

The reducer 44 also comprises a peripheral, internally toothed crown 54 which is fastened, in the assembly shown, by potting in a front radial plate 56 fastened in the case 12 of the starter 10.

An axial bore 58 is made in a rear axial end 60 of the reducer output shaft 20. It opens on to the rear radial face 60 of the rear free end 62 of the output shaft 20 and it is blind at its other front end.

The free front end section 40 of the armature shaft 18 is received in the bore 58 with an axial clearance with respect to the base of the bore 58 and also with a radial clearance. The front free end section 40 is of a diameter smaller than that of the section which carries the planetary gear 42.

By means of this configuration, an axial clearance can be reserved between the front free end section 40 of the armature shaft 18 of the motor 16 and the reducer output shaft 20.

According to a variant (not shown) of the invention, the output shaft does not comprise any bore and the armature shaft is shortened so as not to rub against the output shaft.

A front starter drive assembly 64 slides axially on a splined front section of the reducer output shaft 20, which thus constitutes the starter drive assembly shaft, between a front position of engagement with a starter ring gear (not shown) and a rear stop position, as illustrated in FIG. 1. In the stop position, it is supported axially towards the rear on a shouldering front surface 66 of the reducer output shaft 20.

The contactor 14 is intended for controlling the axial sliding of the starter drive assembly 64 between its front axial position and rear axial position.

According to the teaching of the invention, the armature shaft 18 is guided rotationally by a second front bearing 68 which is inserted axially between the armature windings 22 and the epicyclic gear train speed reducer 44.

Figure 2:
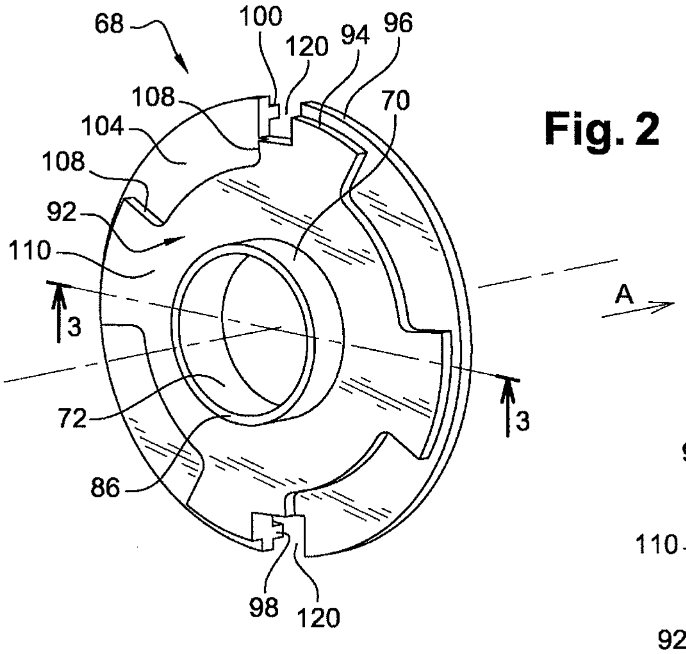
FIG. 2 is a perspective view which shows the front bearing of the armature shaft which is made according to the teaching of the invention.
Figure 3:
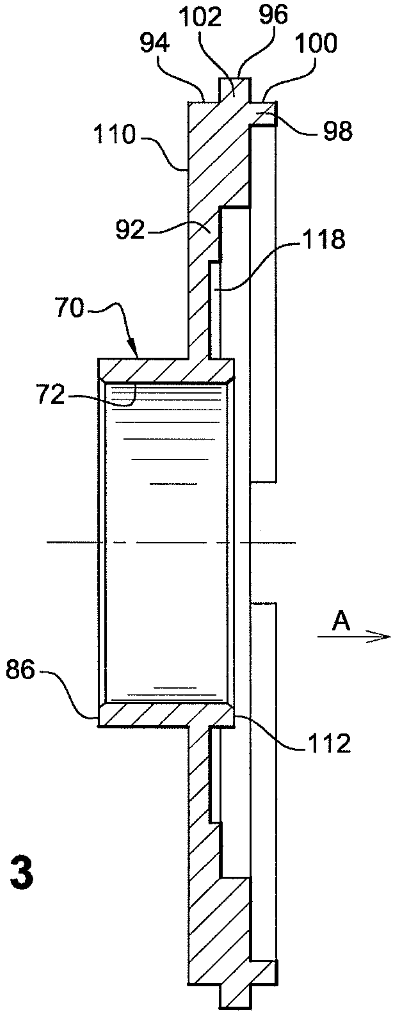
FIG. 3 is an axial section view according to the section plane 3-3 in FIG. 2.

As shown in greater detail in FIGS. 2 and 3, the second front bearing 68 is formed by a disc which is oriented in a radial plane and which comprises in its centre an axial sleeve 70 with a central hole 72 through which the armature shaft 18 passes. The sleeve 70 is projecting, with respect to the disc 68, forwards and backwards.

The central sleeve 70 and the disc 68 are rigidly connected. Here, they are made in one piece of material. The disc 68 is made of steel or aluminium for example or alternatively a plastic.

A supporting section 74 of the armature shaft 18 is thus received so as to rotate in the central hole 72 with the insertion of a plain guide ring or a needle roller guide ring, as illustrated in FIG. 1.

The supporting section 74 of the armature shaft 18 is of a greater diameter than the rear intermediate section which carries the armature windings 22 and than the front section which carries the planetary gear 42 of the reducer 44. In the example shown in the illustrations, the supporting section 74 is of an outside diameter greater than or equal to that of the other sections of the armature shaft 18.

Thus, the armature windings 22 are in axial abutment forwards against a shouldering rear radial face 78 of the supporting section 74.

The armature shaft 18 comprises a collar 82 which is oriented radially from the armature shaft 18 radially outwards in the extension of the shouldering rear face 78. The front face 84 of the collar 82 forms a shouldering face which is intended to come into abutment axially forwards against the rear end edge 86 of the sleeve 70 to lock the armature shaft 18 axially forwards.

Figure 4:
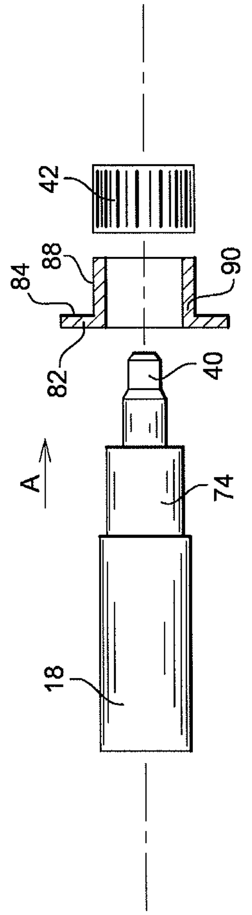
FIG. 4 is an axial section exploded view which shows the armature shaft, on to which a sleeve provided with a collar and a planetary gear are mounted.

As shown in FIG. 4, the collar 82 is made here in one piece with a sleeve 88. The collar 82 is oriented radially outwards from a rear edge 90 of the sleeve 88. The sleeve 88 is force fitted on to the armature shaft 18 to form the external cylindrical face of the supporting section 74 of the armature shaft 18.

In a variant (not shown) of the invention, the armature shaft does not comprise a collar and the axial locking of the armature shaft forwards is carried out by an axial stop, such as a ball, which is inserted between the base of the bore in the rear axial end of the reducer output shaft and a free front end radial face of the armature shaft. According to further embodiments, the armature shaft can be made in one or two parts.

As shown in FIGS. 2 and 3, the disc 68 comprises, on its rear face, an extra thickness 92 which is oriented axially backwards and which has a cylindrical face with a circular external outline 94, hereinafter called external outline 94, which is concentric with the free external circular edge 96 of the disc 68.

Similarly, an annular skirt 98 is oriented axially forwards from the front face of the disc 68.

Thus, the disc 68 comprises an annular peripheral tongue 102 which is oriented radially outwards from the external outlines 94, 100 of the extra thickness 92 and of the skirt 98, up to the free external edge 96 of the disc 68.

The extra thickness 92 is more particularly intended for being fitted into the front end of the frame 21 so as to centre the front bearing 68 directly with respect to the frame 21 by radial support against the internal face of the front peripheral edge of the frame 21. For this purpose, the inside diameter of the front peripheral edge of the frame 21 is substantially equal to the diameter of the external outline 94 of the extra thickness 92.

Similarly, the skirt 98 is intended for being fitted into a rear end of the front case 12 so as to ensure the co-axial state of the armature shaft 18 and output shaft 20. For this purpose, the inside diameter of the rear end of the case 12 is substantially equal to the diameter of the external outline 100 of the skirt 98.

Thus, as illustrated in FIG. 1, the annular tongue 102 is inserted axially and pressed between the front end peripheral edge of the frame 21 and the rear end peripheral edge of the case 12. Thus, the disc 68 is fixed axially with respect to the rigid assembly formed by the case 12 and the frame 21 after they have been assembled.

The case 12 is, for example, fastened to the frame 21 with axial ties (not shown) and bolts with which the case 12 can be axially pressed against the frame 21.

The disc 68 thus forms a dust-tight baffle which prevents the passing of dust from the armature windings 22 to the reducer 44 and vice versa. By means of the disc 68, it is also possible to prevent splashes of lubricant, necessary for the correct operation of the epicyclic gear train speed reducer 44, on to the armature windings 22.

The rear extra thickness 92 of the disc 68 comprises notches 104 in its external outline 94, which are four in number here and which are evenly distributed around its periphery.

More particularly, the frame 21 carries on its internal cylindrical face an inductor 106 which is formed by a plurality of magnetised bars 106 (or exciting coils in other embodiments) of axial orientation which are evenly arranged around the armature windings 22. The magnetised bars 106 are four in number here. The magnetised bars 106 are separated circumferentially by spacers (not shown) in the form of an axial clip with a transverse profile in the shape of a "U" open radially inwards. The inductor 106 is fixed with respect to the frame 21.

By means of the free rear face 110 of the extra thickness 92, it is also possible to block the forward axial displacements of the spacer clips of the inductor 106 or of the magnets, according to the arrangement of the inductor.

Moreover, during operation of the starter 10, the rear flange 52 for fastening the planetary gears 46 of the reducer 44 is capable of resting axially against the front edge 112 of the sleeve 70 of the disc 68.

Figure 5:
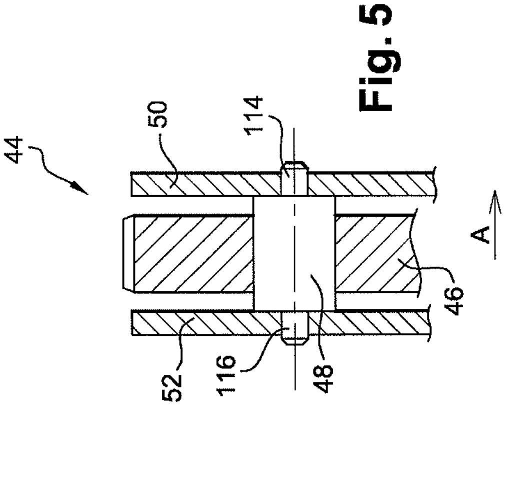
FIG. 5 is an axial section, larger-scale detail view which shows a planetary gear of the epicyclic gear train speed reducer in FIG. 1.

As shown in FIG. 5, to prevent the planetary gears 46 from being pressed between the two flanges 50, 52 and thus being braked in their own rotation, the rotary shaft 48 of each planetary gear 46 is extended forwards and backwards respectively by a front pin 114 and a rear pin 116 respectively, these being of a diameter smaller than that of the rotary shaft 48. Each pin 114 and 116 extends into the flanges 50, 52 and is intended for being force fitted or received by screwing or crimpage in an associated hole in the front flange 50 and rear flange 52 for the fastening of the rotary shaft 48 to the flanges 50, 52.

Thus, the rotary shaft 48 forms an axial spacer to prevent the axial nipping of the planetary gears 46 between the two flanges 50, 52 when the front bearing 68 is supported axially against the rear flange 52. The flanges 50, 52 are thus kept axially apart sufficiently to allow the free rotation of the planetary gears 46. In other words, as shown in FIG. 5, the rotary shaft (or spacer) 48 provides an axial clearance between the planetary gears 46 and at least one of the radial flanges 50, 52.

According to the method of fastening, the rear pin of each rotary shaft 48 of the planetary gears 46 can run in projections axially backwards from the rear face of the rear flange 52. To allow them to pass without increasing the axial overall dimension of the starter 10, the front face of the disc 68 has an annular depression 118 forming a track so that the projecting ends of the rear pins 116 of the rotary shafts 48 can pass.

The disc 68 also comprises means of angular indexing of the frame 21 with respect to the case 12.

For this purpose, the disc 68 comprises two opposite recesses 120 which are formed in its free external edge 96. Each recess bites into the rear extra thickness 92.

As shown in FIG. 1, each recess 120 is intended for receiving an associated lug 122 which runs axially backwards from the case 12. The lugs 122 are here carried by the external crown 54 of the reducer 44. The crown 54 is in fact fastened rigidly in the case 12. Angular indexing is thus made possible.

According to a variant of the invention not shown, the disc comprises a lug which runs axially forwards from a front edge, for example from the annular tongue and which is intended for being received in a recess of the case. The case can then comprise a plurality of recesses so that the frame can be indexed as desired in one of several angular positions around its shaft.

By means of the fitting of the lugs 122 into the recesses 120, it is also possible to strengthen the rotational immobilisation of the disc 68 with respect to the rigid assembly formed by the frame 21 and case 12 after assembly.

Figure 6:
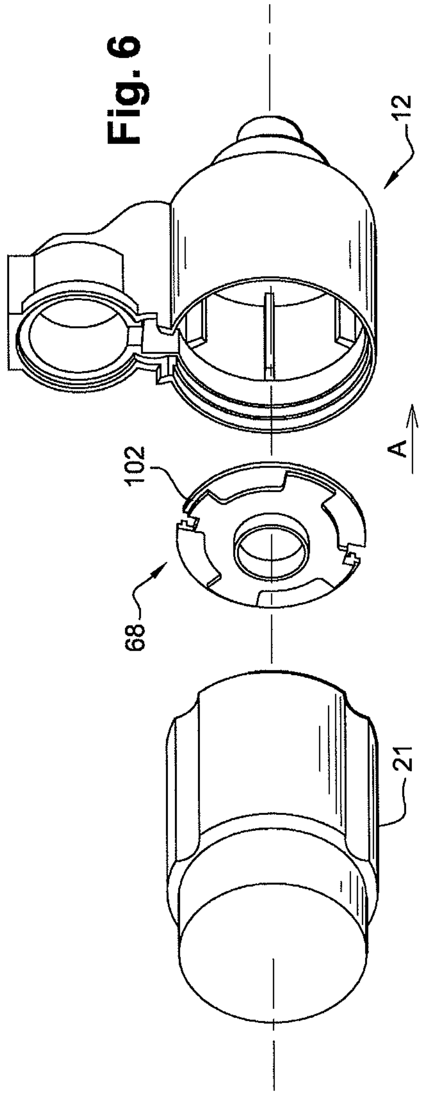
FIG. 6 is an exploded perspective view of the starter.

As shown in FIGS. 4 and 6, the assembly of the starter 10 is carried out by successive assembly of its components and particularly by the placing of the reducer output shaft 20 and of the epicyclic gear train speed reducer 44 in the case 12 and then of the disc 68 forming the front bearing 68, after which the armature shaft 18 is introduced axially forwards into the central hole 72 of the sleeve 70 of the disc 68.

For this purpose, the inside diameter of the central hole 72 is larger than the outside diameter of the planetary gear 42 so that it can be passed through for engagement with the planetary gears 46.

To prevent friction between rotationally movable elements and fixed elements, it is necessary to provide axial operation clearances at the time of design of the starter 10, particularly between the front face 84 of the collar 82 on the armature shaft 18 and the rear end edge 86 of the sleeve 70 of the disc 68.

By means of the disc 68, forming the front bearing 68, it is possible to perform several functions due to its arrangement, inserted between the armature windings 22 and the reducer 44.

Thus, with the disc 68, it is possible to centre the armature shaft 18 with respect to the frame 21 by means of support being provided directly on the internal cylindrical face of the frame 21 due to the external outline 94 of the extra thickness 92.

In addition, by means of the diameter of the supporting section 74 which is greater than that of the other sections of the armature shaft 18, it is possible to increase the strength of the starter 10, avoiding premature wear of the front bearing 68 or of the plain rotational guide ring or a needle roller guide ring with respect to other elements of the starter 10. In fact, with the large diameter, it is possible to obtain a larger cylindrical bearing surface between the armature shaft 18 and the front bearing 68, by means of which the stresses can be distributed and wear can thus be slowed down.

Moreover, the rear end edge 86 of the sleeve 70 of the disc 68 advantageously forms an axial stop for the axial locking forwards of the armature shaft 18. Thus, by means of the disc 68, it is possible to perform a radial centring function and axial stop function at the same time.

When the collar 82 on the armature shaft 18 is supported axially forwards against the sleeve 70 of the disc 68, the axial stress is transmitted to the peripheral edge of the case 12 via the annular tongue 102.

In addition, the disc 68, arranged thus, forms a sealed baffle between the armature windings 22 and epicyclic gear train speed reducer 44, with which the integrity of each of these two elements can be preserved.

With the disc 68 thus provided with notches 104, angular indexing can be carried out so as to simplify assembly of the starter 10.

Moreover, with the portion of extra thickness 92 arranged circumferentially between two notches 104, it is possible to ensure the axial locking of the spacer clips of the inductor 106 of the electric motor 16.

Finally, the form of the rotary shafts 48 of the planetary gears 46 forms a spacer with which it is possible to keep the two flanges 50, 52 sufficiently apart so that the planetary gears 46 can rotate freely in any circumstances.

The invention claimed is:

1. A motor vehicle starter (10) comprising:

an electric motor (16) comprising a rear armature shaft (18) carrying armature windings (22) and rotationally guided by a first rear bearing (32) and by a second front bearing (68);

a coaxial front output shaft (20) carrying a starter drive assembly (64) and rotationally driven by the rear armature shaft (18);

an epicyclic gear train speed reducer (44) inserted axially between the rear armature shaft (18) and the front output shaft (20) for the coupling thereof;

the second front bearing (68) inserted axially between the armature windings (22) and the reducer (44) so that a supporting section (74) of the armature shaft (18) received in the front bearing (68);

the reducer (44) comprising planetary gears (46) carried by the output shaft (20) and fitted rotationally between two front (50) and rear (52) radial flanges;

the front bearing (68) capable of being supported axially against the rear flange (52);

the reducer (44) further comprising at least one spacer (48) such that the radial flanges (50, 52) being kept apart axially by the at least one spacer (48) so as to provide an axial clearance between the planetary gears (46) and at least one of the radial flanges (50, 52) in order to prevent the nipping of the planetary gears (46) when the front bearing (68) is supported axially against the rear radial flange (52).

2. The starter (10) according to claim 1, wherein the spacer (48) is formed by a rotary shaft to which a planetary gear (46) is fitted.

3. The starter (10) according to claim 2, wherein the armature shaft (18) comprises a shouldering face (84) which is into abutment axially forwards against the second front bearing (68) to limit the displacement of the armature shaft (18) axially forwards.

4. The starter (10) according to claim 3, wherein the shouldering face (84) is carried by a collar (82) which runs radially outwards from the armature shaft (18).

5. The starter (10) according claim 4, wherein the front bearing (68) forms a sealed baffle between the armature windings (22) and the speed reducer (44).

6. The starter (10) according to claim 5, wherein the electric motor (16) is housed in a cylindrical frame (21), coaxial with the armature shaft (18), and wherein the front bearing (68) is centered directly with respect to the frame (21) by radial support against an internal cylindrical face of an front peripheral edge of the frame (21).

7. The starter (10) according to claim 6, further comprising a front case (12) to which are fastened the electric motor (16) and a contactor (14) for controlling the axial sliding of the starter drive assembly (64), wherein the front bearing (68) is inserted axially between the case (12) and the frame (21).

8. The starter (10) according to claim 7, wherein the front bearing (68) comprises means of angular indexing (106, 120, 122) of the frame (21) with respect to the case (12).

9. The starter (10) according to claim 8, wherein the front bearing (68) is angularly indexed with respect to the case (12)

by means of at least one recess (120) which is carried by either the front bearing (68) or the case (12) and which is intended for receiving a lug (122) carried by the other element (12, 68).

10. The starter (10) according to claim 8, further comprising an inductor (106) which is formed by a plurality of magnetised bars, and/or exciting coils, of axial orientation which are arranged evenly around the armature windings (22).

11. The starter (10) according to claim 10, wherein the magnetised bars (106) are separated circumferentially by axial spacers, and in that the axial sliding forwards of the spacers is limited by a rear end radial face (110) of the front bearing (68).

12. The starter (10) according to claim 1, wherein the spacer is carried by the front and rear radial flanges so as to extend thereinto.

13. The starter (10) according to claim 12, wherein the spacer is provided with a front pin extending from the spacer and into the front flange, and a rear pin extending from the spacer and into the rear flange.

14. The starter (10) according to claim 13, wherein each of the front and rear pins is of a diameter smaller than a diameter of the spacer.

* * * * *